UNITED STATES PATENT OFFICE.

WALTER E. MASLAND, OF WILMINGTON, DELAWARE, ASSIGNOR TO E. I. DU PONT DE NEMOURS POWDER COMPANY, OF WILMINGTON, DELAWARE, A CORPORATION OF NEW JERSEY.

ACETYLATION OF DICHLORHYDROCARBONS.

1,102,347. Specification of Letters Patent. Patented July 7, 1914.

No Drawing. Application filed October 19, 1912. Serial No. 726,602.

*To all whom it may concern:*

Be it known that I, WALTER E. MASLAND, of Wilmington, in the county of Newcastle, and in the State of Delaware, have invented a certain new and useful Improvement in Acetylation of Dichlorhydrocarbons, and do hereby declare that the following is a full, clear, and exact description thereof.

My invention relates more particularly to the acetylation of dichlorhydrocarbons, and especially dichlorhydrocarbons derived from hydrocarbons of the paraffin series. It is, however, applicable to the acetylation of many other organic compounds.

The object of my invention is to bring about the acetylation of compounds of the above character, and especially those derived from certain members of the paraffin series of hydrocarbons, in an advantageous manner.

My invention is particularly applicable to obtaining diacetates, as well as chlorolefins.

The surprising fact, which is the basis of the present application, is that by using acetic acid of from 70 to 99 per cent., substantially the same yields can be obtained as with the use of glacial acetic acid.

As one illustrative embodiment of my invention, I will describe the acetylation of dichlorhydrocarbons derived from pentane and hexane and their isomers. Assuming that pentane, isopentane, hexane and isohexanes have been obtained by fractionation of a mixture of hydrocarbons such, for example, as gasolene, and that they have been subjected to chlorination by treatment with chlorin in the presence of light to produce dichlorhydrocarbons, and that the products thus obtained are distilled to separate the dichlorhydrocarbons from the remaining products, these dichlorhydrocarbons are subjected to acetylation in the following manner: The dichlorhydrocarbons are placed in a vessel tightly sealed and capable of withstanding a high pressure, together with a quantity of acetic acid and sodium acetate, sufficient of the latter being provided to combine with all the chlorin present with the exception of the chlorin contained in the chlorolefins produced. I have discovered that the reaction can be effected by the use of sodium acetate. I have also discovered that the acetic acid used may be of any concentration down to 70% while the literature bearing upon acetylation states that glacial acetic acid (*i. e.* stronger than 99%) must be used. The vessel is then heated, preferably by a steam jacket, with steam at the ordinary working pressure of about 100 pounds, and then with superheated steam, or steam at approximately 250 pounds pressure to raise the temperature to about 180° C. or above. The charge should preferably be heated from two to twelve hours, according to the temperature used, the higher the temperature, the shorter the time required. The reaction having been completed, the contents of the vessel are distilled either before or after cooling. The contents of the still are finally subjected to distillation by injected steam in addition to the heating by means of the steam jacket. The acetic acid and oily products are distilled over and separated from each other. The oily products of acetylation are then treated to neutralize the same by the addition of sodium carbonate or other alkali. The neutral product thus obtained is used as obtained, or it is redistilled to separate it into its various component parts and remove impurities. A molecule of acetic acid will also be produced in the process of acetylation for each molecule of chlorolefin produced. The purified product will then contain diacetates and chlorolefins. The reactions are as follows:

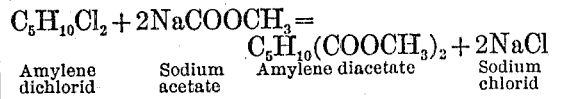

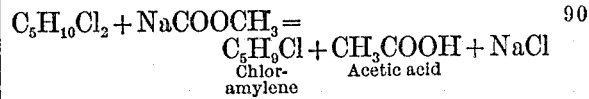

When the process is carried out in accordance with my invention, it can be effected much more cheaply than in the manner in which the process was previously effected. The use of sodium acetate permits a very marked saving in expense and the use of acetic acid of concentrations lower than was previously found possible also effects a very great saving in expense.

While I have described my invention above in detail, I wish it to be understood that many changes may be made therein without departing from the spirit of my invention.

I claim:

1. The process which comprises acetylating a dichlorhydrocarbon with an acetate and acetic acid of from 70% to 99% strength.

2. The process which comprises acetylating a dichlorpentane with an acetate and acetic acid of from 70% to 99% strength.

3. The process which comprises acetylating a dichlorhydrocarbon with sodium acetate and acetic acid of from 70% to 99% strength.

4. The process which comprises acetylating a dichlorpentane with sodium acetate and acetic acid of from 70% to 99% strength.

5. The process which comprises acetylating a mixture of dichlorpentane and dichlorhexane with sodium acetate and acetic acid of from 70% to 99% strength.

6. The process which comprises acetylating a dihalogen derivative of a hydrocarbon with an acetate and acetic acid of from 70% to 99% strength.

7. The process which comprises acetylating a dihalogen derivative of a hydrocarbon with sodium acetate and acetic acid of from 70% to 99% strength.

8. The process which comprises acetylating a dihalogen derivative of pentane with sodium acetate and acetic acid of from 70% to 99% strength.

9. The process which comprises acetylating a mixture of a dihalogen derivative of pentane and a dihalogen derivative of hexane with sodium acetate and acetic acid of from 70% to 99% strength.

In testimony that I claim the foregoing I have hereunto set my hand.

WALTER E. MASLAND.

Witnesses:
 FIN SPARRE,
 W. J. R. HILL.